United States Patent
Cui (10) Patent No.: US 11,934,910 B2
(45) Date of Patent: Mar. 19, 2024

(54) INFORMATION PROCESSING METHOD, DEVICE AND SYSTEM AND COMPUTER-READABLE STORAGE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventor: Lisha Cui, Beijing (CN)

(73) Assignees: BEIJING WODONG TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 17/759,277

(22) PCT Filed: Mar. 22, 2021

(86) PCT No.: PCT/CN2021/082084
§ 371 (c)(1),
(2) Date: Jul. 21, 2022

(87) PCT Pub. No.: WO2021/190449
PCT Pub. Date: Sep. 30, 2021

(65) Prior Publication Data
US 2023/0068598 A1     Mar. 2, 2023

(30) Foreign Application Priority Data
Mar. 24, 2020    (CN) .......................... 202010212918.8

(51) Int. Cl.
*G06K 7/10*     (2006.01)
*G06Q 20/20*     (2012.01)
*G07G 3/00*     (2006.01)

(52) U.S. Cl.
CPC ....... *G06K 7/10445* (2013.01); *G06Q 20/208* (2013.01); *G07G 3/003* (2013.01)

(58) Field of Classification Search
CPC .... G06K 7/10445; G06K 19/00; G06Q 20/08; G07G 3/003; G06F 16/381
(Continued)

(56) References Cited

U.S. PATENT DOCUMENTS

| 2005/0061870 A1 | 3/2005 | Stockton |
| 2007/0057768 A1* | 3/2007 | Zeng ..................... H04L 9/3249 340/572.1 |

(Continued)

FOREIGN PATENT DOCUMENTS

| CN | 104603850 A | 5/2015 |
| CN | 105373916 A | 3/2016 |

(Continued)

OTHER PUBLICATIONS

"International Search Report and Written Opinion of the International Searching Authority" with English translation, International Application No. PCT/CN2021/082084, dated May 27, 2021, 17 pages.

(Continued)

*Primary Examiner* — Edwyn Labaze
(74) *Attorney, Agent, or Firm* — Myers Bigel, P.A.

(57) ABSTRACT

The present disclosure relates to an information processing method, device, system and computer-readable storage medium, which relates to the field of computer technology. The method of the present disclosure includes: obtaining an identification of an offline item in response to a case that a terminal of a user scans an identification code on the item to successfully obtain a possession or use right of the item; determining an identification of a Radio Frequency Identification (RFID) tag on the item according to the identification of the item; and modifying the RFID tag or a state corresponding to the RFID tag according to the identification of the RFID tag to cause the item to be determined as (Continued)

Obtain an identification of an offline item in response to a case that a terminal of a user scans an identification code on the item to successfully obtain a possession or use right of the item — S102

Determine an identification of a RFID tag on the item is according to the identification of the item — S104

Modify the RFID tag or a state corresponding to the RFID tag according to the identification of the RFID tag to cause the item to be determined as having passed a checkout verification when the RFID tag is read — S106 having passed a checkout verification when the RFID tag is read.

18 Claims, 6 Drawing Sheets

(58) Field of Classification Search
USPC .................................................. 235/375, 487
See application file for complete search history.

(56) References Cited

U.S. PATENT DOCUMENTS

| | | | |
|---|---|---|---|
| 2008/0191882 A1* | 8/2008 | Zhou ........................ | G06F 21/79 340/572.4 |
| 2014/0001258 A1 | 1/2014 | Chan et al. | |
| 2015/0242842 A1* | 8/2015 | Piva ................... | G06Q 20/3278 340/572.1 |
| 2016/0300455 A1 | 10/2016 | Hutchings et al. | |
| 2017/0046707 A1 | 2/2017 | Krause et al. | |
| 2018/0025601 A1 | 1/2018 | Gao et al. | |
| 2019/0087702 A1 | 3/2019 | Cotoc | |

FOREIGN PATENT DOCUMENTS

| | | |
|---|---|---|
| CN | 205281581 U | 6/2016 |
| CN | 108777045 A | 11/2018 |
| CN | 109284955 A | 1/2019 |
| CN | 109426956 A | 3/2019 |
| CN | 112288420 A | 1/2021 |

OTHER PUBLICATIONS

"Communication with Supplementary European Search Report", EP Application No. 21777187.2, dated Nov. 8, 2023, 8 pp.

* cited by examiner

INFORMATION PROCESSING METHOD, DEVICE AND SYSTEM AND COMPUTER-READABLE STORAGE MEDIUM

CROSS REFERENCE TO RELATED APPLICATIONS

The present disclosure is a U.S. National Stage Application under 35 U.S.C. § 371 of International Patent Application No. PCT/CN2021/082084, filed on Mar. 22, 2021, which is based on and claims priority of Chinese application for invention No. 2020010212918.8 filed on Mar. 24, 2020, the disclosures of both of which are hereby incorporated into this disclosure by reference in its entirety.

TECHNICAL FIELD

The present disclosure relates to the field of computer technology, in particular to an information processing method, a device, a system and a computer-readable storage medium.

BACKGROUND

With the development of Internet technology, our life is becoming more and more convenient. For example, self-service devices have appeared in supermarkets, libraries and other places. With the self-service devices, users can shop or borrow books by themselves, thereby user experiences can be improved.

For example, a self-service in a supermarket mainly involves providing self-checkout devices mounted at entrances and exits, so that a customer can check out by scanning a bar code on an item at the self-checkout device to degauss a tag on the item. After checkout, the customer carrying the item can pass the verification of an anti-theft door smoothly without triggering an alarm. A self-service in a library is similar.

SUMMARY

According to some embodiments of the present disclosure, an information processing method is provided, comprising: obtaining an identification of an offline item in response to a case that a terminal of a user scans an identification code on the item to successfully obtain a possession or use right of the item; determining an identification of a Radio Frequency Identification (RFID) tag on the item according to the identification of the item; and modifying the RFID tag or a state corresponding to the RFID tag according to the identification of the RFID tag to cause the item to be determined as having passed a checkout verification when the RFID tag is read.

In some embodiments, modifying the RFID tag according to the identification of the RFID tag to cause the item to be determined as having passed the checkout verification when the RFID tag is read comprises: invoking a RFID writer to determine the RFID tag according to the identification of the RFID tag and modify a signal sent by the RFID tag to a preset signal indicating that the item has passed the checkout verification, to cause the item to be determined as having passed the checkout verification when the RFID tag is read.

In some embodiments, modifying the RFID tag according to the identification of the RFID tag to cause the item to be determined as having passed the checkout verification when the RFID tag is read comprises: invoking a RFID writer to determine the RFID tag according to the identification of the RFID tag and set the RFID tag to be invalid, to cause the item to be determined as having passed the checkout verification when the RFID tag is read.

In some embodiments, the method further comprises: receiving indication information corresponding to the preset signal sent from a RFID reader after the RFID reader has read the RFID tag; determining that the item has passed the checkout verification according to the indication information; and sending a release instruction to an anti-theft device.

In some embodiments, modifying the state corresponding to the RFID tag according to the identification of the RFID tag to cause the item to be determined as having passed the checkout verification when the RFID tag is read comprises: changing a status flag bit corresponding to the identification of the RFID tag into a state indicating that the item has passed the checkout verification.

In some embodiments, the method further comprises: receiving information of the RFID tag sent from a RFID reader after RFID reader has read the RFID tag, wherein the information of the RFID tag comprises: the identification of the RFID tag and information corresponding to the item; determining that the state of the status flag bit corresponding to the identification of the RFID tag indicate that the item has passed the checkout verification; and sending a release instruction to an anti-theft device.

In some embodiments, the method further comprises: receiving information of the RFID tag sent from a RFID reader after the RFID reader has read the RFID tag; obtaining information of the item according to the information of the RFID tag, in a case of determining that the item has not passed the checkout verification according to the information of the RFID tag; and displaying the information of the item through a display device to prompt the user that the item has not passed the checkout verification.

In some embodiments, obtaining the identification of the offline item in response to the case that the terminal of the user scans the identification code on the item to successfully obtain the possession or use right of the item comprises: receiving an acquisition request sent from the terminal of the user by scanning the identification code on the item, wherein the acquisition request comprises: information of the identification code; querying detailed information of the item according to the information of the identification code and sending the detailed information of the item to the terminal of the user; receiving acquisition confirmation information sent by the terminal of the user, wherein the acquisition confirmation information comprises: an identification obtained online or an identification obtained offline; generating an order according to the acquisition confirmation information, wherein, if the acquisition confirmation information comprises the identification obtained online, the order comprises the identification obtained online, and if the acquisition confirmation information comprises the identification obtained offline, the order comprises the identification obtained offline; receiving success-in-acquisition information in response to completing a payment of the order on the terminal of the user, wherein the success-in-acquisition information comprises: information of the order; searching the order according to the information of the order; and determining that the user has successfully obtained the possession or use right of the item, and obtaining the identification of the item, in a case that the order comprises the identification obtained offline.

In some embodiments, the method further comprises: obtaining information of the identification code on the item and information of the RFID tag; and storing the identification of the item in association with the information of the identification code and the information of the RFID tag in a database.

According to further embodiments of the present disclosure, there is provided an information processing device, comprising: a processor; and a memory coupled to the processor and storing instructions that when executed by the processor, cause the processor to obtain an identification of an offline item in response to a case that a terminal of a user scans an identification code on the item to successfully obtain a possession or use right of the item; determine an identification of a Radio Frequency Identification (RFID) tag on the item according to the identification of the item; and modify the RFID tag or a state corresponding to the RFID tag according to the identification of the RFID tag to cause the item to be determined as having passed a checkout verification when the RFID tag is read.

In some embodiments, modifying the RFID tag according to the identification of the RFID tag to cause the item to be determined as having passed a checkout verification when the RFID tag is read comprises: invoking a RFID writer to determine the RFID tag according to the identification of the RFID tag and modify a signal sent from the RFID tag to a preset signal indicating that the item has passed the checkout verification or set the RFID tag to be invalid, to cause the item to be determined as having passed the checkout verification when the RFID tag is read.

In some embodiments, modifying the state corresponding to the RFID tag according to the identification of the RFID tag to cause the item to be determined as having passed the checkout verification when the RFID tag is read comprises: changing a status flag bit corresponding to the identification of the RFID tag into a state indicating that the item has passed the checkout verification.

In some embodiments, the memory further stores instructions that when executed by the processor, cause the processor to: receive information of the RFID tag sent from a RFID reader after the RFID reader has read the RFID tag; obtain information of the item according to the information of the RFID tag, in a case of determining that the item has not passed the checkout verification according to the information of the RFID tag; and display the information of the item through a display device to prompt the user that the item has not passed the checkout verification.

According to still other embodiments of the present disclosure, there is provided a non-transitory computer-readable storage medium storing computer programs, when executed by a processor, cause the processor to obtain an identification of an offline item in response to a case that a terminal of a user scans an identification code on the item to successfully obtain a possession or use right of the item; determine an identification of a Radio Frequency Identification (RFID) tag on the item according to the identification of the item; and modify the RFID tag or a state corresponding to the RFID tag according to the identification of the RFID tag to cause the item to be determined as having passed a checkout verification when the RFID tag is read.

According to further embodiments of the present disclosure, there is provided an information processing system, comprising: the information processing device of any one of the foregoing embodiments, and a RFID reader configured to read a RFID tag on an item.

In some embodiments, the system further comprises: a RFID writer configured to determine the RFID tag according to the identification of the RFID tag, and modify a signal sent from the RFID tag to a preset signal indicating that the item has passed the checkout verification or set the RFID tag to be invalid, in response to an invocation from the information processing device, to cause the item to be determined as having passed the checkout verification when the RFID tag is read.

In some embodiments, the system further comprises: an anti-theft device, wherein: the RFID reader is further configured to send indication information corresponding to the preset signal obtained by reading the RFID tag to the information processing device; and the anti-theft device is configured to receive a release instruction sent from the information processing device in a case that the information processing device determines that the item has passed the checkout verification according to the indication information.

In some embodiments, the system further comprises: an anti-theft device, wherein: the RFID reader is further configured to send information of the RFID tag obtained by reading the RFID tag to the information processing device; and the anti-theft device is configured to receive a release instruction sent by the information processing device in a case that the information processing device determines that the state of the status flag bit corresponding to the identification of the RFID tag indicate that the item has passed the checkout verification.

In some embodiments, the system further comprises: a display device, wherein: the RFID reader is further configured to send information of the RFID tag obtained by reading the RFID tag to the information processing device; and the display device is configured to receive information of the item sent by the information processing device, and display the information of the item to prompt the user that the item has not passed the checkout verification, in a case that the information processing device determine that the item has not passed the checkout verification according to the information of the RFID tag.

Other features and advantages of the present invention will become apparent from the following detailed description of exemplary embodiments of the present disclosure with reference to the accompanying drawings.

BRIEF DESCRIPTION OF THE DRAWINGS

In order to more clearly explain the embodiments of the present invention or the technical solutions in the prior art, a brief introduction will be given below for the drawings required to be used in the description of the embodiments or the prior art. It is obvious that, the drawings illustrated as follows are merely some embodiments of the present disclosure. For a person skilled in the art, he or she may also acquire other drawings according to such drawings on the premise that no inventive effort is involved.

DETAILED DESCRIPTION

Below, a clear and complete description will be given for the technical solution of embodiments of the present disclosure with reference to the figures of the embodiments. Obviously, merely some embodiments of the present disclosure, rather than all embodiments thereof, are given herein. The following description of at least one exemplary embodiment is in fact merely illustrative and is in no way intended as a limitation to the invention, its application or use. All other embodiments obtained by those of ordinary skill in the art based on the embodiments of the present disclosure without creative efforts shall fall within the protection scope of the present disclosure.

The inventors have found that in all self-service schemes in supermarkets or libraries known to the inventors, specific self-service devices are used to scan bar codes and degauss tags on items, which may cause users to queue and impact the efficiency of the self-service when there are many users. If a terminal such as a mobile phone of a user is used to checkout or rent an item rather than the specific self-service device, a checkout verification scheme is also necessary to be designed to determine that the item is checkout or rented successfully to ensure security.

In view of this, a technical problem to be solved by the present disclosure is: how to improve the efficiency of a self-service checkout or rental of an offline item and ensure security.

In view of the above problem, the present disclosure provides an information processing method, which will be described below with reference to FIG. 1.

Figure 1:
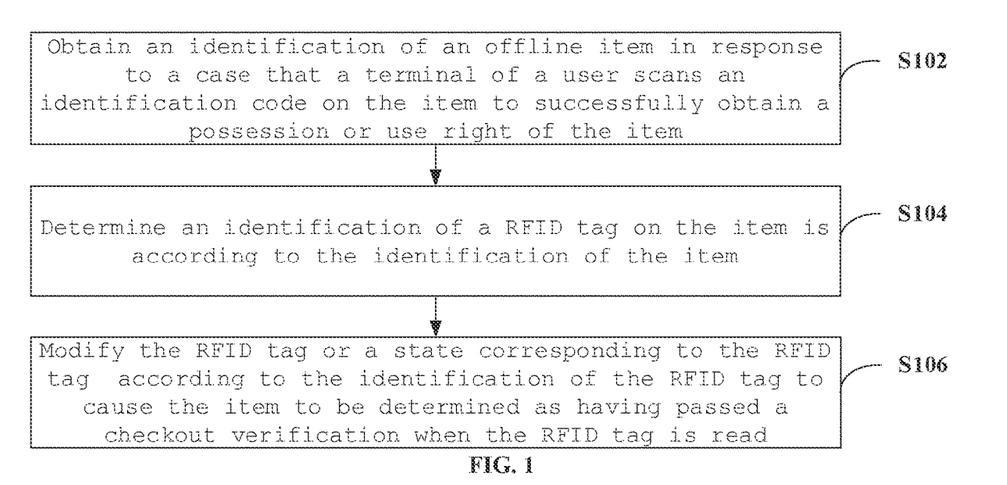
FIG. 1 shows a flowchart of an information processing method according to some embodiments of the present disclosure.

FIG. 1 is a flowchart of an information processing method according to some embodiments of the present disclosure. As shown in FIG. 1, the method of this embodiment comprises: steps S102 to S106.

In step S102, an identification of an offline item is obtained in response to a case that a terminal of a user scans an identification code on the item to successfully obtain a possession or use right of the item.

In some embodiments, in response to a case that the terminal of the user reads the identification code on the item to successfully obtain at least one of the possession, ownership, control and use right of the item, the identification of the item is obtained. A case of successfully obtaining of at least one of the possession, ownership, control and use right of the item can be understood as a case that the user purchases or rents the item, which can be paid or free.

For example, the user make a transactions by paying fees or virtual resources to obtain the possession, ownership, control and use right of the offline item. For example, the possession or ownership right of the item can be obtained by purchasing the item, and the use or control right of the item can be obtained by renting the item. The user can also obtain the use right of the offline item free of charge, such as the user borrow a book freely. The identification code, such as a QR code or bar code, can be provided on the offline item. The user can obtain the possession or use right of the item by scanning the identification code with the terminal. In the case of successfully obtaining the possession or use right of the item, information of the successfully obtaining may be sent from a payment system or item management system. Information in the identification code can comprise the identification of the item, or information in one-to-one correspondence with the identification of the item. Thus, the identification of the item can be determined according to the information of the identification code.

In step S104, an identification of a RFID (Radio Frequency Identification) tag on the item is determined according to the identification of the item.

The RFID tag can be set on the item, which can send a radio frequency signal. Information of the RFID tag can be obtained by decoding the radio frequency signal. The information of the RFID tag can comprise the identification of the RFID tag, which is used to uniquely identify the RFID tag. The information of the RFID tag can further comprise information corresponding to the item, which can be the same as the identification of the item, or can be in one-to-one correspondence with the identification of the item. For example, if the information corresponding to the item is in one-to-one correspondence with the identification of the item, the correspondence between the information corresponding to the item and the identification of the item can be stored in a database, and the correspondence between the identification of the RFID tag and the identification of the item can also be stored. A query request can be sent to the database. The query request may comprise: the identification of the item, and the identification of the RFID tag of the item returned from the database can be received.

In step S106, the RFID tag or a state corresponding to the RFID tag is modified according to the identification of the RFID tag to cause the item to be determined as having passed a checkout verification when the RFID tag is read.

For example, relevant information of the RFID tag is modified according to the identification of the RFID tag, to cause the item to be determined as having passed a checkout verification when the RFID tag is read. The relevant information of the RFID tag comprises, for example, at least one of the radio frequency signal sent from the RFID tag and a state corresponding to the RFID tag.

In some embodiments, a RFID writer is invoked to determine the RFID tag according to the identification of the RFID tag, and modify a signal sent from the RFID tag to a preset signal indicating that the item has passed the checkout verification or set the RFID tag to be invalid, to cause the item to be determined as having passed the checkout verification when the RFID tag is read.

The identification of the RFID tag can be sent to the RFID writer that can be used to write data to the RFID tag to modify the radio frequency signal sent from the RFID tag. For example, relevant information of the item in the RFID tag can be modified or custom data can be added into the RFID tag to modify the signal sent from the RFID tag to the preset signal indicating that the item has passed the checkout verification. In this way, when the RFID tag is read, it can be determined that the item has passed the checkout verification according to the preset signal. The RFID writer can also set the RFID tag to invalid. In this case, the RFID tag will not be recognized, and the item can directly pass through an anti-theft device, indicating that the item has passed the checkout verification. RFID writers can be disposed at multiple locations in a shopping cart or indoors to communicate with RFID tags.

In some embodiments, a state flag bit corresponding to the identification of the RFID tag is changed into a state indicating that the item has passed the checkout verification, so as to modify the state corresponding to the RFID tag to determine that the item has passed the checkout verification when the RFID tag is read. After the RFID tag is read, the item is determined as having passed the checkout verification by querying the corresponding status flag bit.

In the above embodiment, the identification code and the RFID tag can be provided on the item, and the user can successfully obtain the possession or use right of the offline item by scanning the identification code on the offline item with the terminal. After the information of successfully obtaining is received, the information of the RFID tag is determined according to the identification of the item carried in the information of successfully obtaining. The item is determined as having passed the check inspection when the RFID tag is read through modifying the RFID tag or the state corresponding to the RFID tag according to the information of the RFID tag. Because the user can purchase or rent the item using his/her own terminal without the need of a specific self-service device, the efficiency can be improved. Through setting or modifying the RFID tag, whether the item has passed the checkout verification can be determined, so as to ensure the safety of the item.

An information processing method according to other embodiments of the present disclosure will be described below with reference to FIG. 2. The information processing method of the present disclosure can be executed by an information processing device.

Figure 2:
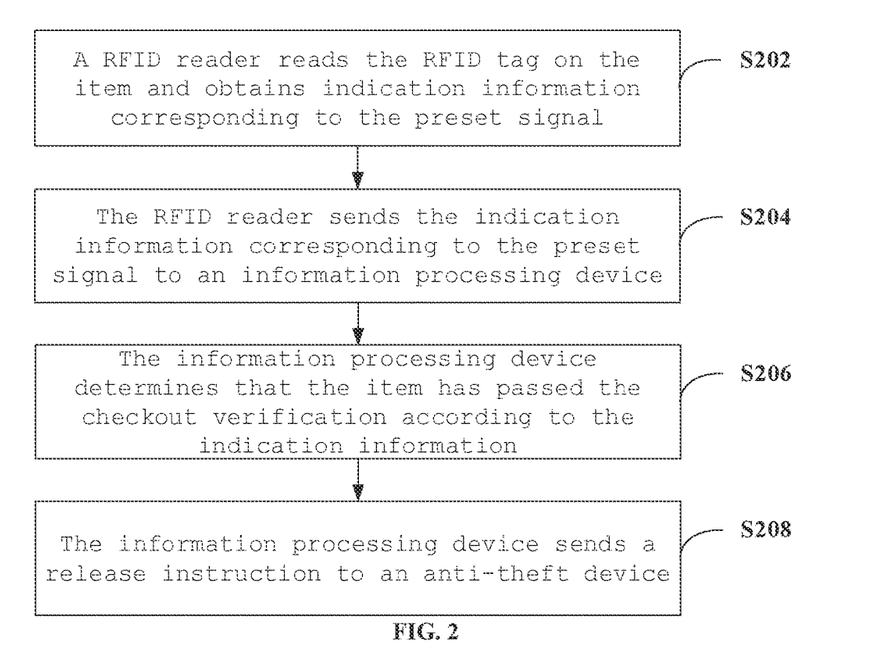
FIG. 2 shows a flowchart of an information processing method according to other embodiments of the present disclosure.

FIG. 2 is a flowchart of an information processing method according to other embodiments of the present disclosure. As shown in FIG. 2, in the case of modifying the RFID tag, after step S106, the method further comprises: steps S202 to S208.

In step S202, a RFID reader reads the RFID tag on the item and obtains indication information corresponding to the preset signal.

The RFID reader can be disposed on an anti-theft device at an exit of a supermarket or library or near the anti-theft device. The RFID reader reads the RFID tag, that is, after receiving the radio frequency signal sent from the RFID, it can decode and obtain the information of the RFID tag. In the case that the RFID tag is modified to send the preset signal, the RFID reader can obtain indication information corresponding to the preset signal.

In step S204, the RFID reader sends the indication information corresponding to the preset signal to an information processing device.

In step S206, the information processing device determines that the item has passed the checkout verification according to the indication information.

The information processing device can analyze the indication information corresponding to the preset signal. For example, the indication information comprises the modified relevant information of the item or the added custom data to indicate that the item has passed the checkout verification, so that the information processing device identifies that the item has passed the checkout verification.

In step S208, the information processing device sends a release instruction to an anti-theft device.

Step S208 is optional. For example, if the anti-theft device is not provided with an interceptor, the information processing device can send an alarm instruction to the anti-theft device only if the item has failed to pass the checkout verification, and does not send an instruction to the anti-theft device if the item has passed the checkout verification.

By changing the signal of the RFID tag, the method of the above embodiment enables the item successfully obtained by the user to pass the checkout verification smoothly, thereby improving the efficiency of self-service.

An information processing method according to still other embodiments of the present disclosure will be described below with reference to FIG. 3.

Figure 3:
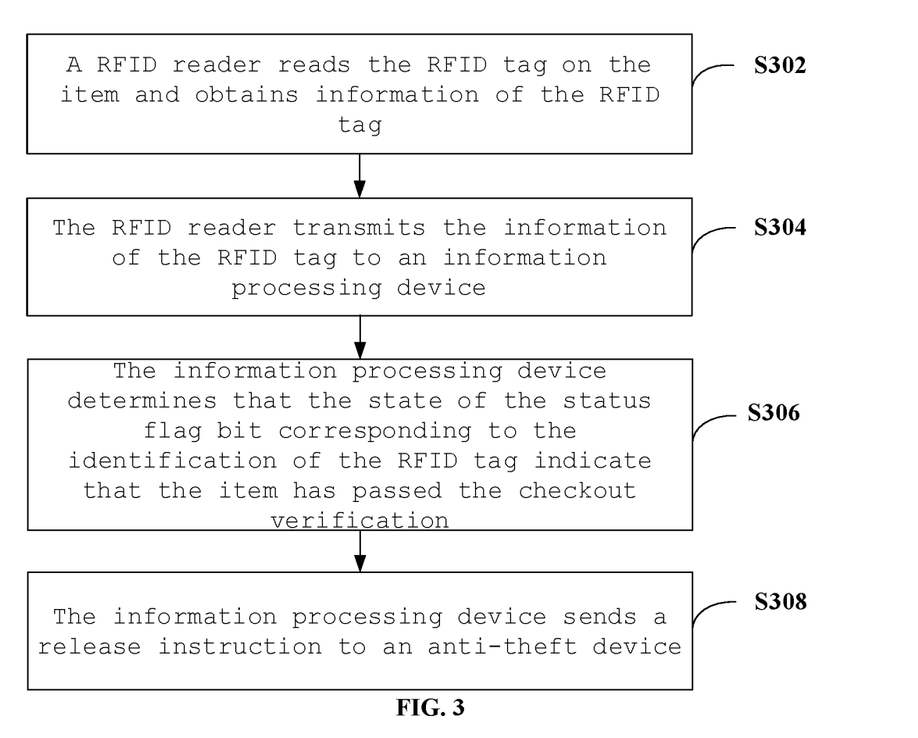
FIG. 3 shows a flowchart of an information processing method according to still other embodiments of the present disclosure.

FIG. 3 is a flowchart of an information processing method according to still other embodiments of the present disclosure. As shown in FIG. 3, in the case of modifying a state corresponding to the RFID tag, after step S106, the method further comprises: steps S302 to S308.

In step S302, a RFID reader reads the RFID tag on the item and obtains information of the RFID tag.

The information of the RFID tag may comprise: an identification of the RFID tag and information corresponding to the item.

In step S304, the RFID reader transmits the information of the RFID tag to an information processing device.

In step S306, the information processing device determines that the state of the status flag bit corresponding to the identification of the RFID tag indicate that the item has passed the checkout verification.

The identification of the RFID tag, the identification of the item, the information corresponding to the item and the status flag bit can be stored in association with each other. The information corresponding to the item can be the identification of the item or information that is in one-to-one correspondence with the identification of the item.

In step S308, the information processing device sends a release instruction to an anti-theft device.

Step S308 is optional.

By modifying the status flag bit corresponding to the RFID tag, the method of the above embodiment enables the item successfully obtained by the user to pass the checkout verification smoothly, thereby improving the efficiency of self-service.

An information processing method according to still other embodiments of the present disclosure will be described below with reference to FIG. 4.

Figure 4:
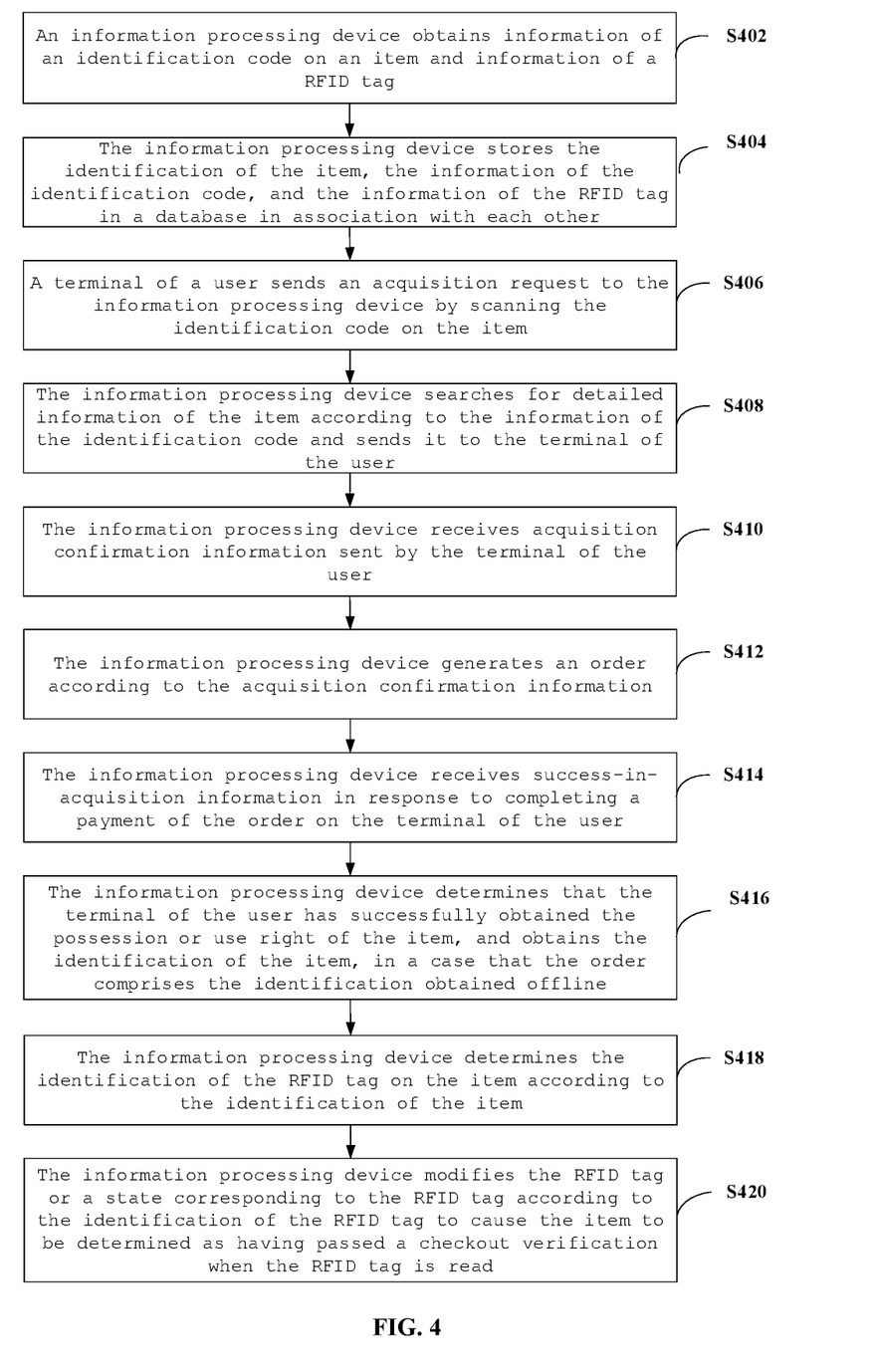
FIG. 4 shows a flowchart of an information processing method according to still other embodiments of the present disclosure.

FIG. 4 is a flowchart of an information processing method according to still other embodiments of the present disclosure. As shown in FIG. 4, the method of this embodiment comprises: steps S402 to S420.

In step S402, an information processing device obtains information of an identification code on an item and information of a RFID tag.

The information of the identification code on the item can be obtained through a code scanning device. The information of the identification code can be the identification of the item or can be information that is in one-to-one correspondence with the identification of the item. The information of the RFID tag can be read using a RFID reader.

In step S404, the information processing device stores the identification of the item, the information of the identification code, and the information of the RFID tag in a database in association with each other.

According to the identification code, the identification of the item can be determined. It is also possible to only store a correspondence between the identification of the item and the information of the RFID tag.

In step S406, a terminal of a user sends an acquisition request to the information processing device by scanning the identification code on the item.

The acquisition request may comprise: information of the identification code.

In step S408, the information processing device queries for detailed information of the item according to the information of the identification code and sends it to the terminal of the user.

The detailed information of the item may comprise, but is not limited to: at least one of the price, name, model of the item. A details page may be displayed on the terminal of the user.

In step S410, the information processing device receives acquisition confirmation information sent from the terminal of the user.

For example, the acquisition confirmation information comprises: an identification obtained online or an identification obtained offline. For example, the acquisition confirmation information is sent after the item is added to an online shopping cart or offline shopping cart. The user can choose to obtain an online item, in which case no verification is required and the item can be delivered to the user by means of distribution. The user can also choose to obtain an offline item, in which case the subsequent processes related to the RFID tag will be triggered.

In step S412, the information processing device generates an order according to the acquisition confirmation information.

If the acquisition confirmation information comprises the identification obtained online, the order comprises the identification obtained online, and if the acquisition confirmation information comprises the identification obtained offline, the order comprises the identification obtained offline. The order may further comprises the identification, price and other information of the item.

In step S414, the information processing device receives success-in-acquisition information in response to completing a payment of the order on the terminal of the user.

The success-in-acquisition information may comprise: information of the order, such as an order number, etc.

In step S416, the information processing device searches the order according to the information of the order, determines that the user has successfully obtained the possession or use right of the item, and obtains the identification of the item, in a case that the order comprises the identification obtained offline.

In step S418, the information processing device determines the identification of the RFID tag on the item according to the identification of the item.

In step S420, the information processing device modifies the RFID tag or a state corresponding to the RFID tag according to the identification of the RFID tag to cause the item to be determined as having passed a checkout verification when the RFID tag is read.

In some embodiments, if the user does not use the terminal to obtain the possession or use right of the item, or if the user does not obtain the possession or use right of the item successfully, the following steps are performed.

(1) The RFID reader reads the RFID tag on the item and obtains information of the RFID tag.

The information of the RFID tag may comprise: the identification of the RFID tag and the information corresponding to the item.

(2) The RFID reader transmits the information of the RFID tag to the information processing device.

(3) The information processing device obtains information of the item according to the information of the RFID tag, in a case of determining that the item has not passed the checkout verification according to the information of the RFID tag.

(4) The information processing device displays the information of the item on a display device to prompt the user that the item has not passed the checkout verification.

The display device can be installed near the anti-theft device to display items that have not passed the checkout verification. For example, the display device displays a name, picture, price, etc. of the item, and can prompt the user to perform a checkout or rental operation. The information processing device can also send an alarm instruction to the anti-theft device, which can send alarm information accordingly.

The disclosure also provides an information processing device, which can be provided in an existing order system or anti-theft device, or can be provided independently, or modules for executing different methods in the device can be provided in different existing systems or devices respectively. The following description will be given with reference to FIG. 5.

Figure 5:
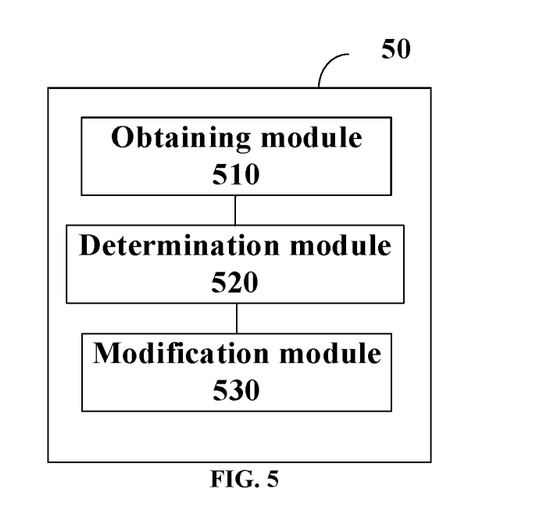
FIG. 5 shows a structural diagram of an information processing device according to some embodiments of the present disclosure.

FIG. 5 is a block diagram of an information processing device according to some embodiments of the present disclosure. As shown in FIG. 5, the device 50 of this embodiment comprises an obtaining module 510, a determination module 520 and a modification module 530.

The obtaining module 510 is configured to obtain an identification of an offline item in response to a case that a terminal of a user scans an identification code on the item to successfully obtain a possession or use right of the item;

In some embodiments, the obtaining module 510 is configured to receive an acquisition request sent from the terminal of the user by scanning the identification code on the item, wherein the acquisition request comprises: information of the identification code; query detailed information of the item according to the information of the identification code and sending the detailed information of the item to the terminal of the user; receive acquisition confirmation information sent by the terminal of the user, wherein the acquisition confirmation information comprises: an identification obtained online or an identification obtained offline; generate an order according to the acquisition confirmation information, wherein, if the acquisition confirmation information comprises the identification obtained online, the order comprises the identification obtained online, and if the acquisition confirmation information comprises the identification obtained offline, the order comprises the identification obtained offline; receive success-in-acquisition information in response to completing a payment of the order on the terminal of the user, wherein the success-in-acquisition information comprises: information of the order; search the order according to the information of the order; and determine that the user has successfully obtained the possession or use right of the item, and obtaining the identification of the item, in a case that the order comprises the identification obtained offline.

The determination module 520 is configured to determine an identification of a RFID tag on the item according to the identification of the item.

The modification module 530 is configured to modify the RFID tag or a state corresponding to the RFID tag according to the identification of the RFID tag to cause the item to be determined as having passed a checkout verification when the RFID tag is read.

In some embodiments, the modification module 530 is configured to invoke a RFID writer to determine the RFID tag according to the identification of the RFID tag and modify a signal sent by the RFID tag to a preset signal indicating that the item has passed the checkout verification or set the RFID tag to be invalid, to cause the item to be determined as having passed the checkout verification when the RFID tag is read.

In some embodiments, the modification module 530 is configured to change a status flag bit corresponding to the identification of the RFID tag into a state indicating that the item has passed the checkout verification.

Figure 6:
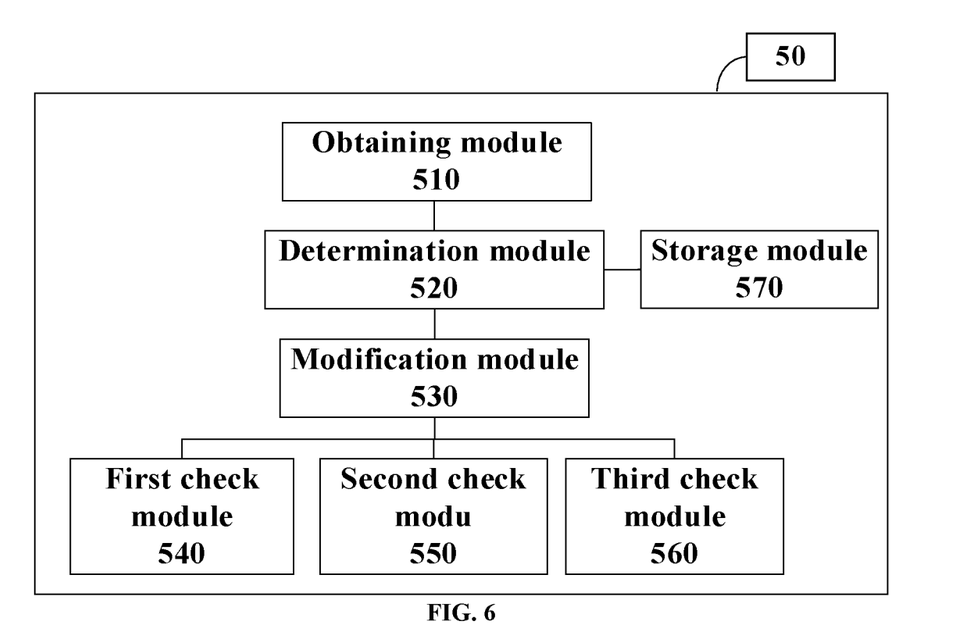
FIG. 6 shows a structural diagram of an information processing device according to other embodiments of the present disclosure.

As shown in FIG. 6, in some embodiments, the device further comprises: a first check module 540 configured to receive indication information corresponding to the preset signal sent from a RFID reader after the RFID reader has read the RFID tag; determine that the item has passed the checkout verification according to the indication information; and send a release instruction to an anti-theft device.

In some embodiments, the system further comprises: a second check module 550 configured to receive information of the RFID tag sent from a RFID reader after RFID reader has read the RFID tag, wherein the information of the RFID tag comprises: the identification of the RFID tag and information corresponding to the item; determine that the state of the status flag bit corresponding to the identification of the RFID tag indicate that the item has passed the checkout verification; and send a release instruction to an anti-theft device.

In some embodiments, the device further comprises: a third check module 560 configured to receive information of the RFID tag sent from a RFID reader after the RFID reader has read the RFID tag; obtain information of the item according to the information of the RFID tag, in a case of determining that the item has not passed the checkout verification according to the information of the RFID tag; and display the information of the item through a display device to prompt the user that the item has not passed the checkout verification.

In some embodiments, the device further comprises: a storage module 570 configured to obtain information of the identification code on the item and information of the RFID tag; and store the identification of the item in association with the information of the identification code and the information of the RFID tag in a database.

The information processing device of this embodiment of the present disclosure may be implemented by various computing devices or computer systems, which will be described below with reference to FIGS. 7 and 8.

Figure 7:
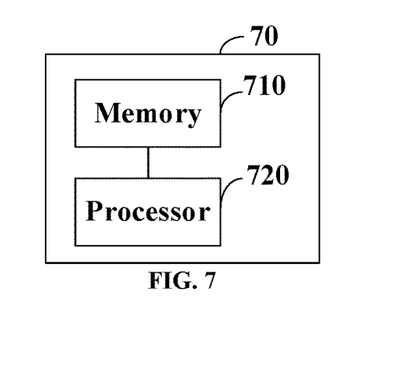
FIG. 7 shows a structural diagram of an information processing device according to still other embodiments of the present disclosure.

FIG. 7 is a block diagram of an information processing device according to some embodiments of the present disclosure. As shown in FIG. 7, the device 70 of this embodiment comprises memory 710 and a processor 720 coupled to the memory 710, the processor 720 configured to, based on instructions stored in the memory 710, carry out the information processing method according to any one of the embodiments of the present disclosure.

Wherein, the memory 710 may comprise, for example, system memory, a fixed non-volatile storage medium, or the like. The system memory stores, for example, an operating system, applications, a boot loader, a database, and other programs.

Figure 8:
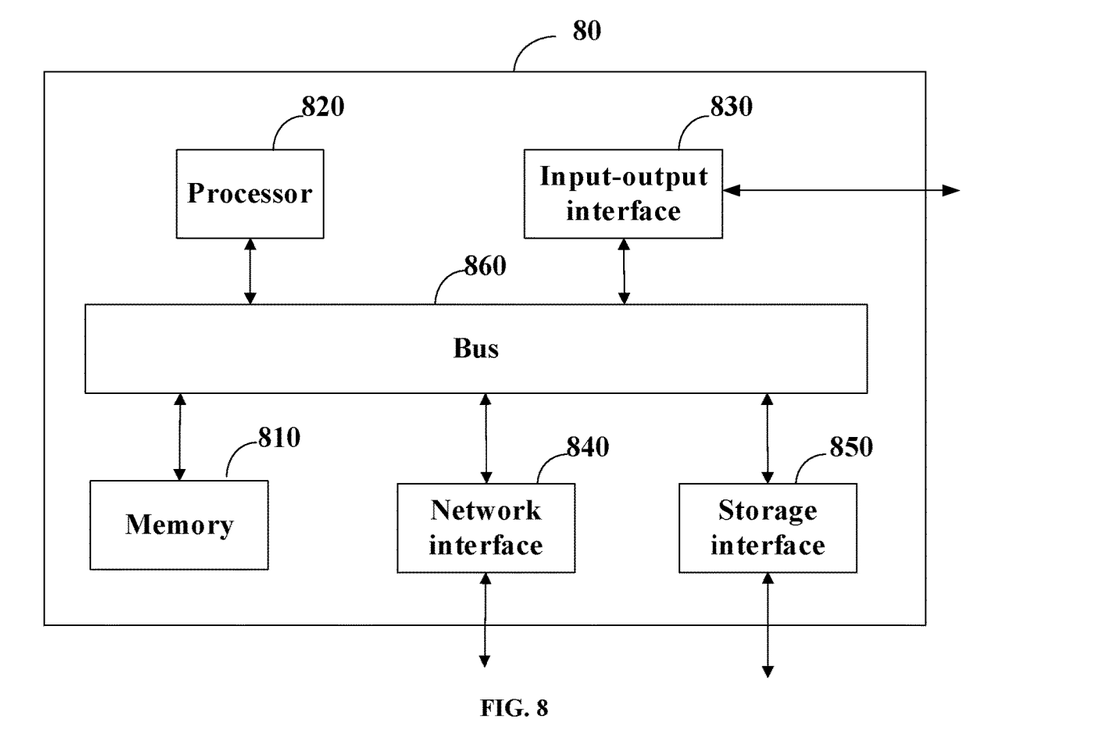
FIG. 8 shows a structural diagram of an information processing device according to still other embodiments of the present disclosure.

FIG. 8 is a block diagram of an information processing device according to other embodiments of the present disclosure. As shown in FIG. 8, the device 80 of this embodiment comprises a memory 810 and a processor 820 that are similar to the memory 710 and the processor 720, respectively. It may also comprise an input-output interface 830, a network interface 840, a storage interface 850, and the like. These interfaces 830, 840, 850 and the memory 810 and the processor 820 may be connected to each other through a bus 860, for example. Wherein, the input-output interface 830 provides a connection interface for input-output devices such as a display, a mouse, a keyboard, and a touch screen. The network interface 840 provides a connection interface for various networked devices, for example, it can be connected to a database server or a cloud storage server. The storage interface 850 provides a connection interface for external storage devices such as an SD card and a USB flash disk.

The present disclosure also provides an information processing system, which will be described below with reference to FIG. 9.

Figure 9:
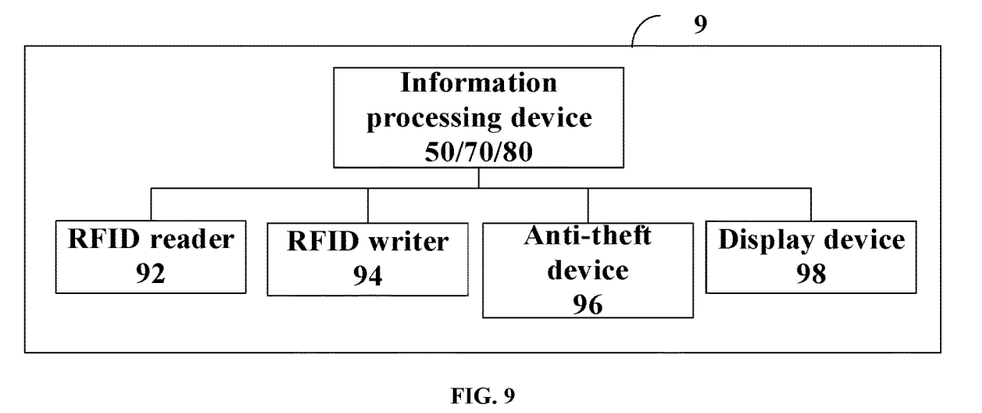
FIG. 9 shows a structural diagram of an information processing system according to some embodiments of the present disclosure.

FIG. 9 is a block diagram of an information processing system according to an embodiment of the present disclosure. As shown in FIG. 9, the system 9 of this embodiment comprises: the information processing device 50/70/80 of any one of the foregoing embodiments, and a RFID reader 92 configured to read a RFID tag on an item.

In some embodiments, the system further comprises: a RFID writer 94 configured to determine the RFID tag according to the identification of the RFID tag, and modify a signal sent from the RFID tag to a preset signal indicating that the item has passed the checkout verification or set the RFID tag to be invalid, in response to an invocation from the information processing device 50/70/80, to cause the item to be determined as having passed the checkout verification when the RFID tag is read.

In some embodiments, the system further comprises: an anti-theft device 96; the RFID reader 92 is further configured to send indication information corresponding to the preset signal obtained by reading the RFID tag to the information processing device 50/70/80; the anti-theft device 96 is configured to receive a release instruction sent from the information processing device 50/70/80 in a case that the information processing device 50/70/80 determines that the item has passed the checkout verification according to the indication information.

In some embodiments, the RFID reader 92 is further configured to send information of the RFID tag obtained by reading the RFID tag to the information processing device 50/70/80; the anti-theft device 96 is configured to receive a release instruction sent by the information processing device 50/70/80 in a case that the information processing device 50/70/80 determines that the state of the status flag bit corresponding to the identification of the RFID tag indicate that the item has passed the checkout verification.

In some embodiments, the system further comprises: a display device 98; the RFID reader 92 is further configured to send information of the RFID tag obtained by reading the RFID tag to the information processing device 50/70/80; the display device 98 is configured to receive information of the item sent by the information processing device 50/70/80, and display the information of the item to prompt the user that the item has not passed the checkout verification, in a case that the information processing device 50/70/80 determine that the item has not passed the checkout verification according to the information of the RFID tag.

Those skilled in the art should understand that the embodiments of the present disclosure may be provided as a method, a system, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, devices (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing device to generate a machine such that the instructions executed by a processor of a computer or other programmable data processing device to generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

The above is merely preferred embodiments of this disclosure, and is not limitation to this disclosure. Within spirit and principles of this disclosure, any modification, replacement, improvement and etc. shall be contained in the protection scope of this disclosure.

What is claimed is:

1. An information processing method, comprising:
obtaining an identification of an offline item in response to a case that a terminal of a user scans an identification code on the item to successfully obtain a possession or use right of the item, comprising:
receiving an acquisition request sent from the terminal of the user by scanning the identification code on the item, wherein the acquisition request comprises information of the identification code;
querying detailed information of the item according to the information of the identification code and sending the detailed information of the item to the terminal of the user;
receiving acquisition confirmation information sent by the terminal of the user, wherein the acquisition confirmation information comprises an identification indicating that the item is obtained offline;
generating an order according to the acquisition confirmation information, wherein the order comprises the identification indicating that the item is obtained offline;
receiving success-in-acquisition information in response to completing a payment of the order on the terminal of the user, wherein the success-in-acquisition information comprises information of the order;
searching the order according to the information of the order; and
determining that the user has successfully obtained the possession or use right of the item, and obtaining the identification of the item;
determining an identification of a Radio Frequency Identification (RFID) tag on the item according to the identification of the item; and
modifying the RFID tag or a state corresponding to the RFID tag according to the identification of the RFID tag to cause the item to be determined as having passed a checkout verification when the RFID tag is read.

2. The information processing method according to claim 1, wherein modifying the RFID tag according to the identification of the RFID tag to cause the item to be determined as having passed the checkout verification when the RFID tag is read comprises:
invoking a RFID writer to determine the RFID tag according to the identification of the RFID tag and modify a signal sent by the RFID tag to a preset signal indicating that the item has passed the checkout verification, to cause the item to be determined as having passed the checkout verification when the RFID tag is read.

3. The information processing method according to claim 2, further comprising:
receiving indication information corresponding to the preset signal sent from a RFID reader after the RFID reader has read the RFID tag;
determining that the item has passed the checkout verification according to the indication information; and
sending a release instruction to an anti-theft device.

4. The information processing method according to claim 1, wherein modifying the RFID tag according to the identification of the RFID tag to cause the item to be determined as having passed the checkout verification when the RFID tag is read comprises:
invoking a RFID writer to determine the RFID tag according to the identification of the RFID tag and set the RFID tag to be invalid, to cause the item to be determined as having passed the checkout verification when the RFID tag is read.

5. The information processing method according to claim 1, wherein modifying the state corresponding to the RFID tag according to the identification of the RFID tag to cause the item to be determined as having passed the checkout verification when the RFID tag is read comprises:
changing a status flag bit corresponding to the identification of the RFID tag into a state indicating that the item has passed the checkout verification.

6. The information processing method according to claim 5, further comprising:
receiving information of the RFID tag sent from a RFID reader after RFID reader has read the RFID tag, wherein the information of the RFID tag comprises: the identification of the RFID tag and information corresponding to the item;
determining that the state of the status flag bit corresponding to the identification of the RFID tag indicate that the item has passed the checkout verification; and
sending a release instruction to an anti-theft device.

7. The information processing method according to claim 1, further comprising:
receiving information of the RFID tag sent from a RFID reader after the RFID reader has read the RFID tag;
obtaining information of the item according to the information of the RFID tag, in a case of determining that the item has not passed the checkout verification according to the information of the RFID tag; and displaying the information of the item through a display device to prompt the user that the item has not passed the checkout verification.

8. The information processing method according to claim 1, further comprising:

obtaining information of the identification code on the item and information of the RFID tag; and storing the identification of the item in association with the information of the identification code and the information of the RFID tag in a database.

9. An information processing device, comprising:

a processor; and a memory coupled to the processor and storing instructions that when executed by the processor, cause the processor to:

obtain an identification of an offline item in response to a case that a terminal of a user scans an identification code on the item to successfully obtain a possession or use right of the item, comprising:

receiving an acquisition request sent from the terminal of the user by scanning the identification code on the item, wherein the acquisition request comprises information of the identification code;

querying detailed information of the item according to the information of the identification code and sending the detailed information of the item to the terminal of the user;

receiving acquisition confirmation information sent by the terminal of the user, wherein the acquisition confirmation information comprises an identification indicating that the item is obtained offline;

generating an order according to the acquisition confirmation information, wherein the order comprises the identification indicating that the item is obtained offline;

receiving success-in-acquisition information in response to completing a payment of the order on the terminal of the user, wherein the success-in-acquisition information comprises information of the order;

searching the order according to the information of the order; and determining that the user has successfully obtained the possession or use right of the item, and obtaining the identification of the item;

determine an identification of a Radio Frequency Identification (RFID) tag on the item according to the identification of the item; and modify the RFID tag or a state corresponding to the RFID tag according to the identification of the RFID tag to cause the item to be determined as having passed a checkout verification when the RFID tag is read.

10. An information processing system, comprising: the information processing device according to claim 9, and a RFID reader configured to read a RFID tag on an item.

11. The information processing system according to claim 10, further comprising:

a RFID writer configured to determine the RFID tag according to the identification of the RFID tag, and modify a signal sent from the RFID tag to a preset signal indicating that the item has passed the checkout verification or set the RFID tag to be invalid, in response to an invocation from the information processing device, to cause the item to be determined as having passed the checkout verification when the RFID tag is read.

12. The information processing system according to claim 11, further comprising: an anti-theft device, wherein:

the RFID reader is further configured to send indication information corresponding to the preset signal obtained by reading the RFID tag to the information processing device; and the anti-theft device is configured to receive a release instruction sent from the information processing device in a case that the information processing device determines that the item has passed the checkout verification according to the indication information.

13. The information processing system according to claim 10, further comprising: an anti-theft device, wherein:

the RFID reader is further configured to send information of the RFID tag obtained by reading the RFID tag to the information processing device; and the anti-theft device is configured to receive a release instruction sent by the information processing device in a case that the information processing device determines that the state of the status flag bit corresponding to the identification of the RFID tag indicate that the item has passed the checkout verification.

14. The information processing system according to claim 10, further comprising: a display device, wherein:

the RFID reader is further configured to send information of the RFID tag obtained by reading the RFID tag to the information processing device; and the display device is configured to receive information of the item sent by the information processing device, and display the information of the item to prompt the user that the item has not passed the checkout verification, in a case that the information processing device determine that the item has not passed the checkout verification according to the information of the RFID tag.

15. The information processing device according to claim 9, wherein modifying the RFID tag according to the identification of the RFID tag to cause the item to be determined as having passed a checkout verification when the RFID tag is read comprises:

invoking a RFID writer to determine the RFID tag according to the identification of the RFID tag and modify a signal sent from the RFID tag to a preset signal indicating that the item has passed the checkout verification or set the RFID tag to be invalid, to cause the item to be determined as having passed the checkout verification when the RFID tag is read.

16. The information processing device according to claim 9, wherein modifying the state corresponding to the RFID tag according to the identification of the RFID tag to cause the item to be determined as having passed the checkout verification when the RFID tag is read comprises:

changing a status flag bit corresponding to the identification of the RFID tag into a state indicating that the item has passed the checkout verification.

17. The information processing device according to claim 9, wherein the memory further stores instructions that when executed by the processor, cause the processor to:

receive information of the RFID tag sent from a RFID reader after the RFID reader has read the RFID tag;

obtain information of the item according to the information of the RFID tag, in a case of determining that the item has not passed the checkout verification according to the information of the RFID tag; and display the information of the item through a display device to prompt the user that the item has not passed the checkout verification.

18. A non-transitory computer-readable storage medium storing computer programs, when executed by a processor, cause the processor to:

obtain an identification of an offline item in response to a case that a terminal of a user scans an identification code on the item to successfully obtain a possession or use right of the item, comprising:

receiving an acquisition request sent from the terminal of the user by scanning the identification code on the item, wherein the acquisition request comprises information of the identification code;

querying detailed information of the item according to the information of the identification code and sending the detailed information of the item to the terminal of the user;

receiving acquisition confirmation information sent by the terminal of the user, wherein the acquisition confirmation information comprises an identification indicating that the item is obtained offline;

generating an order according to the acquisition confirmation information, wherein the order comprises the identification indicating that the item is obtained offline;

receiving success-in-acquisition information in response to completing a payment of the order on the terminal of the user, wherein the success-in-acquisition information comprises information of the order;

searching the order according to the information of the order; and determining that the user has successfully obtained the possession or use right of the item, and obtaining the identification of the item;

determine an identification of a Radio Frequency Identification (RFID) tag on the item according to the identification of the item; and modify the RFID tag or a state corresponding to the RFID tag according to the identification of the RFID tag to cause the item to be determined as having passed a checkout verification when the RFID tag is read.

* * * * *